Nov. 18, 1924.

F. S. JONES 1,515,683

SPINDLE BEARING FOR METAL WORKING MACHINES

Filed Feb. 13, 1923   2 Sheets-Sheet 1

Witnesses
George A. Gruss
John E. Burch

Inventor
Frank S. Jones
By Joshua R.H.Potts
his Attorney

Nov. 18, 1924.
1,515,683

F. S. JONES

SPINDLE BEARING FOR METAL WORKING MACHINES

Filed Feb. 13, 1923    2 Sheets-Sheet 2

Witnesses
George A. Gress
John P. Burch

Inventor
Franck S. Jones
By Joshua R. H. Potts
his Attorney

Patented Nov. 18, 1924.

1,515,683

UNITED STATES PATENT OFFICE.

FRANK S. JONES, OF PHILADELPHIA, PENNSYLVANIA.

SPINDLE BEARING FOR METAL-WORKING MACHINES.

Application filed February 13, 1923. Serial No. 618,788.

*To all whom it may concern:*

Be it known that I, FRANK S. JONES, a citizen of the United States, residing at Philadelphia, in the county of Philadelphia and State of Pennsylvania, have invented certain new and useful Improvements in Spindle Bearings for Metal-Working Machines, of which the following is a specification.

This invention relates to bearings and more especially to bearings adapted for use in connection with a cutting member such as a boring bar or spidle.

The objects of this invention are to provide spindle bearings which will effectively resist end thrusts and lateral strains on the spindle, cause the spindle to run true and prevent the usual wobbling or chattering due to wear on the spindle-supporting bearings.

These objects, and other advantageous ends which will be described hereinafter, I attain in the following manner, reference being had to the drawings in which—

Figure 1:
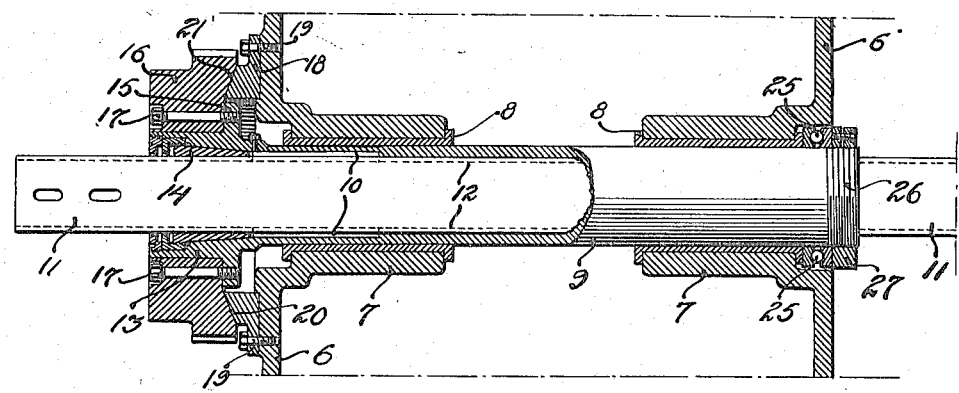
Figure 2:
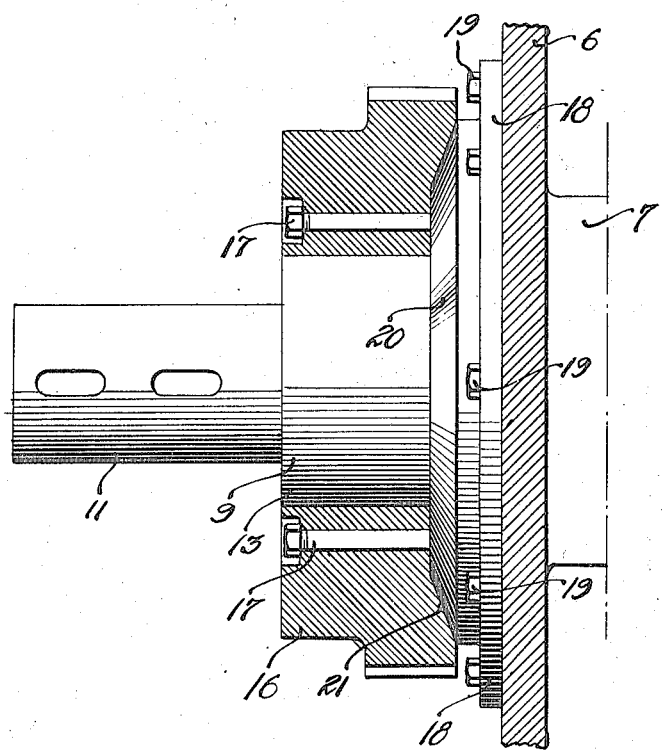
Figure 3:
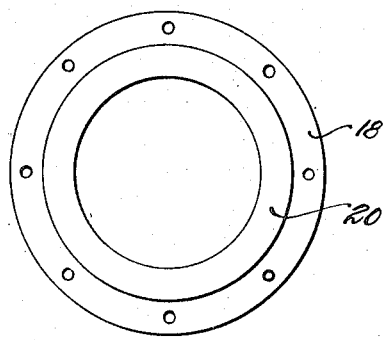
Figure 5:
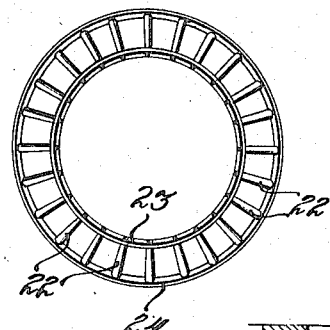
Figure 4:
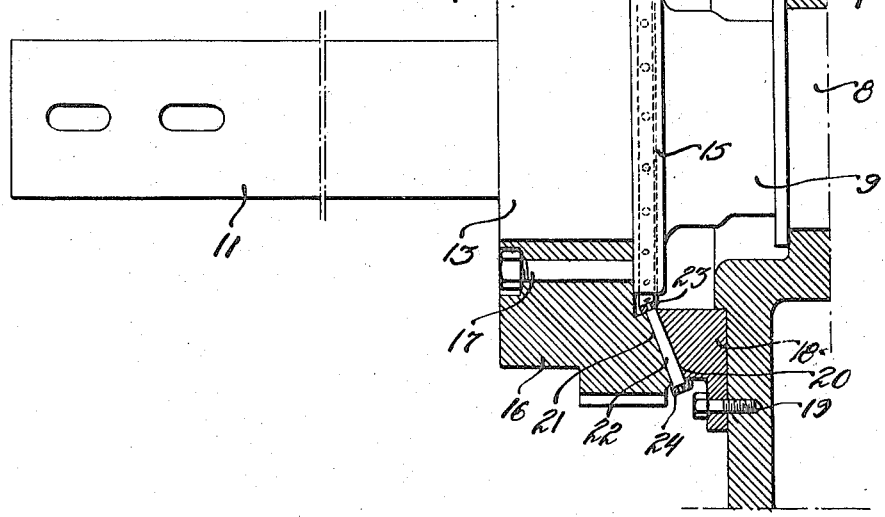

Figure 1 is a sectional elevation showing a spindle and mounting having bearings made in accordance with the invention, Figure 2 is an enlarged fragmentary sectional elevation of one end of the spindle and its bearing, Figure 3 is a face view of a bearing plate, or thrust ring, forming a part of the invention, Figure 4 is an enlarged fragmentary sectional elevation, showing another form of bearing, and Figure 5 is a face view of an anti-friction means.

In the drawings, 6 is a frame, such as a saddle or gear box of a horizontal boring mill. Frame 6 is provided with bearings 7 having suitable linings 8 in which a sleeve 9 rotates. The sleeve extends through the frame and has internal keys 10, preferably located at its forward end. A boring bar or spindle 11 is splined in sleeve 8, and for this purpose, has opposite keyways 12 receiving the splines or keys 10 to permit the usual endwise movement of the spindle.

Sleeve 9 has, at its forward end a flaring part 13, projecting beyond the saddle, which receives an adjustable cone bearing 14 adapted to take up wear on the spindle at the end of the sleeve and hold it accurately centered. The flared part is provided with an external radial flange 15 to which a bull gear 16 is secured by bolts 17. An annular bearing or thrust plate, 18 is detachably secured to the front wall of the saddle by bolts 19 and has a beveled outer face 20 positioned to align with an oppositely beveled inner face 21 on the bull ring. These cone faces may contact directly as shown in Figures 1 and 2 of the drawings or they may engage interposed anti-friction rollers 22. In the drawings these rollers are shown as tapered and mounted to revolve in connected rings 23 and 24 disposed inwardly and outwardly of the beveled faces 20 and 21.

In order to take up wear between the conical bearings 20 and 21, an anti-friction bearing 25 is mounted on the rear end of sleeve 9 against the adjacent lining 8. The end of the sleeve is threaded, as indicated at 26, and a nut 27 is mounted thereon to engage with bearing 25. Inward movement of the nut will draw the sleeve longitudinally thereby drawing the cone face of the bull gear toward the cone face carried by the frame. The thrust ring 18, being detachable may be readily replaced when excessively worn.

The objectionable chattering of the spindle is due to wear upon the spindle supporting bearings. In my improved construction the wear is transferred to a detachable bearing interposed between the bull gear and the saddle, and simple means are provided for taking up wear on this bearing.

By extending the spindle-carrying sleeve through the saddle a long and positive support is provided.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a metal working machine, a saddle; a spindle; a sleeve splined to the spindle; an annular thrust plate secured to the saddle; a bull wheel secured to the sleeve and having a bearing opposed to the thrust plate, and means for taking wear of the bearings.

2. In a metal working machine, a saddle; a spindle; a sleeve splined to the spindle; an annular thrust plate secured to the saddle and having a beveled outer bearing face, a bull wheel secured to the sleeve and having a beveled inner bearing face opposing the beveled face of the thrust plate, and means for taking up wear of the bearings.

3. In a metal working machine, a saddle; a spindle; a sleeve splined to the spindle; an annular thrust plate detachably secured to the saddle; a bull wheel secured to the sleeve and having a bearing opposed to the thrust plate, and means for taking wear of the bearings.

4. In a metal working machine, a saddle; a spindle, a sleeve splined to the spindle; an annular thrust plate secured to the saddle and having an outer bearing face; a bull wheel secured to the sleeve and having an inner bearing face opposed to the bearing face on the thrust plate; anti-friction rollers between the bearing faces, and means for taking up wear on the bearings.

5. In a metal working machine, a saddle; a spindle; a sleeve splined to the spindle and extending through the saddle; an annular thrust plate secured to the saddle; a bull wheel secured to the sleeve and having a bearing opposed to the thrust plate, and an adjustable bearing on the sleeve whereby the thrust bearings may be adjusted to compensate for wear.

6. In a metal working machine, a saddle; a spindle; a sleeve splined to the spindle and extending through the saddle; an annular thrust plate secured to the saddle; a bull wheel secured to the sleeve and having a bearing opposed to the thrust plate, and an adjustable anti-friction bearing on the sleeve whereby the thrust bearings may be adjusted to compensate for wear.

7. In a metal working machine, a saddle; a spindle; a sleeve splined to the spindle; an annular thrust plate secured to the saddle and having a beveled outer bearing face, a bull wheel secured to the sleeve and having a beveled inner bearing face opposing the beveled face on the thrust plate; an anti-friction bearing embracing the sleeve and engaging a bearing fixed to the frame and a nut on the sleeve engaging the anti-friction bearing whereby wear on the anti-thrust bearing may be taken up.

In testimony whereof I have signed my name to this specification in the presence of two subscribing witnesses.

FRANK S. JONES.

Witnesses:
 DAVID A. HAMMOND,
 FELIX C. UNGLAUB.